US010284554B2

(12) United States Patent
Terakedis (10) Patent No.: US 10,284,554 B2
(45) Date of Patent: May 7, 2019

(54) SYSTEMS FOR PROVIDING DEVICE-SPECIFIC ACCESS TO AN E-MAIL SERVER

(71) Applicant: AirWatch, LLC, Atlanta, GA (US)

(72) Inventor: Robert Terakedis, Alpharetta, GA (US)

(73) Assignee: AirWatch, LLC, Atlanta, GA (US)

( * ) Notice: Subject to any disclaimer, the term of this patent is extended or adjusted under 35 U.S.C. 154(b) by 181 days.

(21) Appl. No.: 15/147,480

(22) Filed: May 5, 2016

(65) Prior Publication Data

US 2017/0324710 A1 Nov. 9, 2017

(51) Int. Cl.
*H04L 29/06* (2006.01)
*H04L 12/58* (2006.01)
*H04L 12/46* (2006.01)

(52) U.S. Cl.
CPC .......... *H04L 63/0876* (2013.01); *H04L 51/12* (2013.01); *H04L 63/101* (2013.01); *H04L 12/4641* (2013.01); *H04L 63/029* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 2009/0106550 A1* | 4/2009 | Mohamed | H04L 63/045 713/156 |
| 2012/0262753 A1* | 10/2012 | Viccari | H04N 1/00307 358/1.15 |
| 2013/0111541 A1* | 5/2013 | Yin | G06F 21/577 726/1 |
| 2013/0263212 A1* | 10/2013 | Faltyn | H04W 12/08 726/1 |
| 2014/0250145 A1* | 9/2014 | Jones | G06Q 10/101 707/769 |
| 2017/0094509 A1* | 3/2017 | Mistry | H04L 63/083 |

* cited by examiner

*Primary Examiner* — Benjamin E Lanier
(74) *Attorney, Agent, or Firm* — Clayton, McKay & Bailey, PC (57) ABSTRACT

Systems and methods herein can provide device-specific access to an e-mail server, including an EWS-based e-mail server. In an example, a management server controlled by a system administrator provides device identification information to a user device and to a tunnel server. The management server also provides a custom request identifier to the tunnel server, and provides instructions to the e-mail server to allow access for requests including that custom request identifier. The tunnel server receives a request from the user device, rewrites the request to include the custom request identifier, and passes the request to the e-mail server.

20 Claims, 6 Drawing Sheets

SYSTEMS FOR PROVIDING DEVICE-SPECIFIC ACCESS TO AN E-MAIL SERVER

BACKGROUND

Systems for managing mobile devices, such as Enterprise Mobility Management ("EMM") and Mobile Device Management ("MDM") systems, typically rely on the built-in functionality of an e-mail server and its associated communication protocol to control access for enrolled mobile devices.

For example, MICROSOFT's Exchange ActiveSync ("EAS") is a communications protocol that provides mobile device management, policy controls, and synchronization of e-mail and other information between a server and a mobile device. EAS-based e-mail servers utilize a unique identification number for each device and mail client that connects. Because EAS-based e-mail servers recognize individual devices and mail clients based on a unique identification number, a system administrator can decide to allow or block access to the e-mail server on a device-by-device basis and for particular mail clients. In other words, the system administrator can instruct the EAS-based e-mail server to allow or block requests associated with particular unique identification numbers.

However, this type of device-specific control only exists for certain e-mail clients. Other e-mail clients—such as OUTLOOK for Mac, Mail for Mac, and others—access e-mail servers utilizing protocols that lack device-specific control. For example, OUTLOOK for Mac and Mail for Mac currently leverage MICROSOFT's Exchange Web Services ("EWS") instead of EAS. Unlike EAS e-mail clients, client requests to an EWS-based e-mail server do not include a unique request identifier that identifies the particular device requesting access. As a result, a system administrator cannot choose to allow or block specific devices. At best, the system administrator can only choose to allow or block a particular type of e-mail client as a whole. This lack of granularity in control is not satisfactory.

For example, a system administrator of an EMM system would like to be able to grant or deny access to an EWS-based e-mail server based on the device's compliance and enrollment statuses. But without a way to uniquely identify the device requesting access to the EWS-based e-mail server, this level of control is unavailable.

A need exists for systems and methods for providing device-specific access to an e-mail server, including an EWS-based type of e-mail server, among others.

SUMMARY

Examples described herein include systems and methods for providing device-specific access to an e-mail server, including an EWS-based e-mail server. Although the discussion herein references EWS and EWS-based e-mail servers, these terms are intended to encompass any e-mail server that does not utilize unique request identifiers for a particular device requesting access to the server. For example, EWS-based e-mail servers use request identifiers for identifying the type of e-mail client requesting access, rather than identifying the particular device requesting access. In the case of EWS-based e-mail servers, the request identifier is a user agent string. The terms "request identifier" and "user agent string" are used interchangeably throughout this disclosure, and the term "user agent string" is intended to refer to any request identifier used by an e-mail server to determine, by default, the type of e-mail client connecting to the e-mail server. Each e-mail client has a unique user agent string known to the EWS-based e-mail server. Based on the user agent string, an EWS-based e-mail server can determine which type of e-mail client (for example, OUTLOOK for Mac) is being used to connect to the server. But the server cannot distinguish particular user devices based on their requests.

Some e-mail servers, including EWS-based e-mail servers, can enforce an "allow list" or a "block list" based on the request identifier or user agent string. In additional to enforcing allow and block lists, those e-mail servers can provide an administrator with the ability to allow or block non-default request identifiers, such that an administrator could create a new user agent string and place it on an allow list or a block list.

In an example, a system is provided for improving the functionality of an EWS-based server to customize the user agent string of outgoing requests from an EWS-enabled client and also place the custom user agent string on an allow list for the server. In that way, the system can provide device-specific access to an EWS-based server.

More specifically, an example system is provided that includes a user device, a management server in electronic communication with the user device, and a tunnel server. The management server can be controlled by a system administrator and can provide device identification information to the user device. The device identification information can allow internal system servers to identify the particular user device. The device identification information can include, for example, an authentication certificate, an expected (default) user agent string, and in some cases a custom user agent string. The tunnel server can provide secure access to or from the user device through a Virtual Private Network ("VPN" or "per-app VPN"). A per-app VPN allows for centralized connections from managed e-mail clients within the system. For example, a VPN connection can be created for each e-mail client.

The tunnel server provides a secure channel to connect with any per-app VPN(s) requesting access to an e-mail server. The tunnel server can also receive, from the management server, the device identification information associated with a user device. The device identification information allows the tunnel server to identify the particular user device upon receiving a request from the user device for access to the e-mail server. The tunnel server can assign, replace, or rewrite a custom user agent string in place of the default user agent string in the request. The tunnel server can also provide the e-mail server with the modified request from the user device, including the custom user agent string.

Because the custom user agent string differs from the default user agent strings associated with known e-mail clients, an EWS-based e-mail server typically would not allow access based on a custom user agent string. This can be solved by identifying the custom user agent string to the EWS-based e-mail server. In one example, the management server provides the custom user agent string to the e-mail server, including instructions to allow access to the server for requests including that custom user agent string. The management server can then also provide the custom user agent string to the tunnel server for association with one or more user devices that are allowed access to the e-mail server. In another example, the tunnel server (rather than the management server) provides the identification and instructions to the e-mail server. The tunnel server can also receive a response from the e-mail server and pass the response back to the user device.

Based on compliance and enrollment statuses of the managed user devices, the management server can update a whitelist or blacklist at the EWS-based email server or tunnel server to block or allow email access for the user devices.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1A:
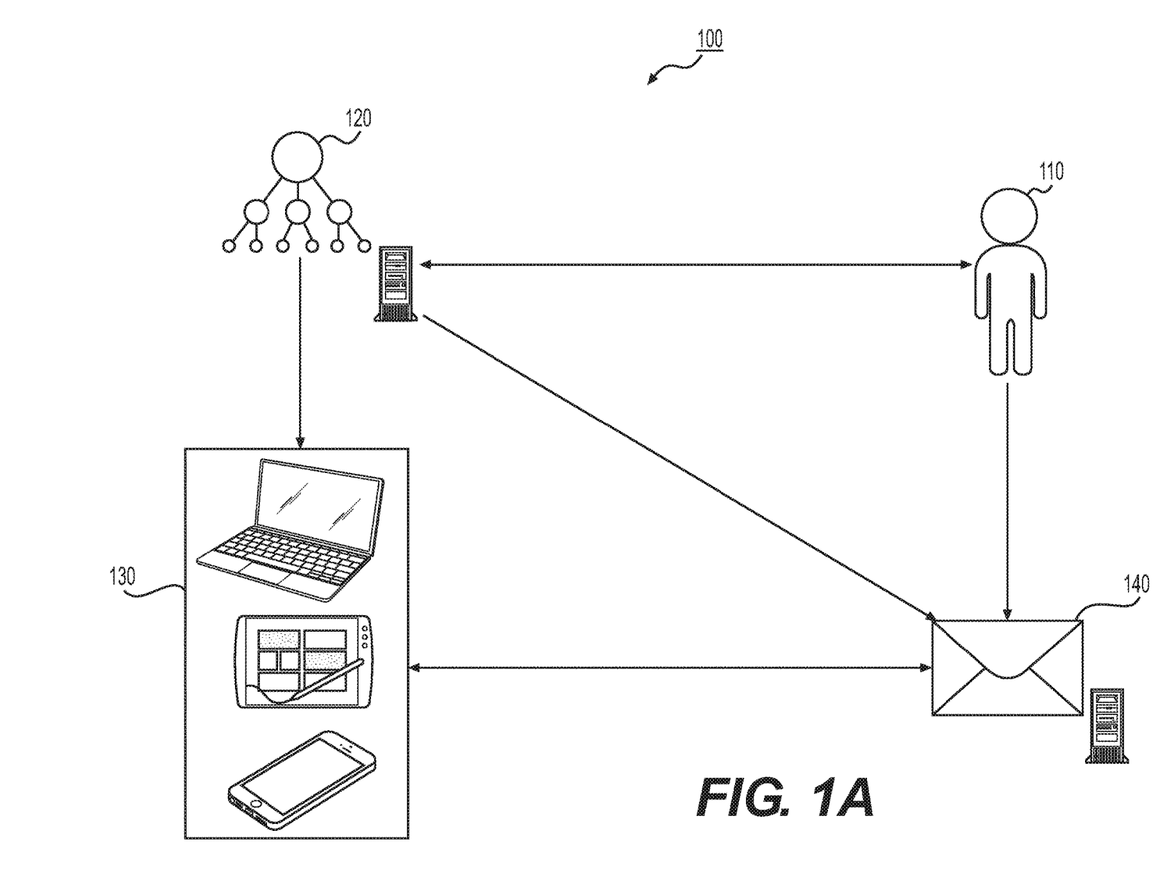
FIG. 1A is an exemplary illustration of system components for providing device-specific access to an e-mail server.
Figure 1B:
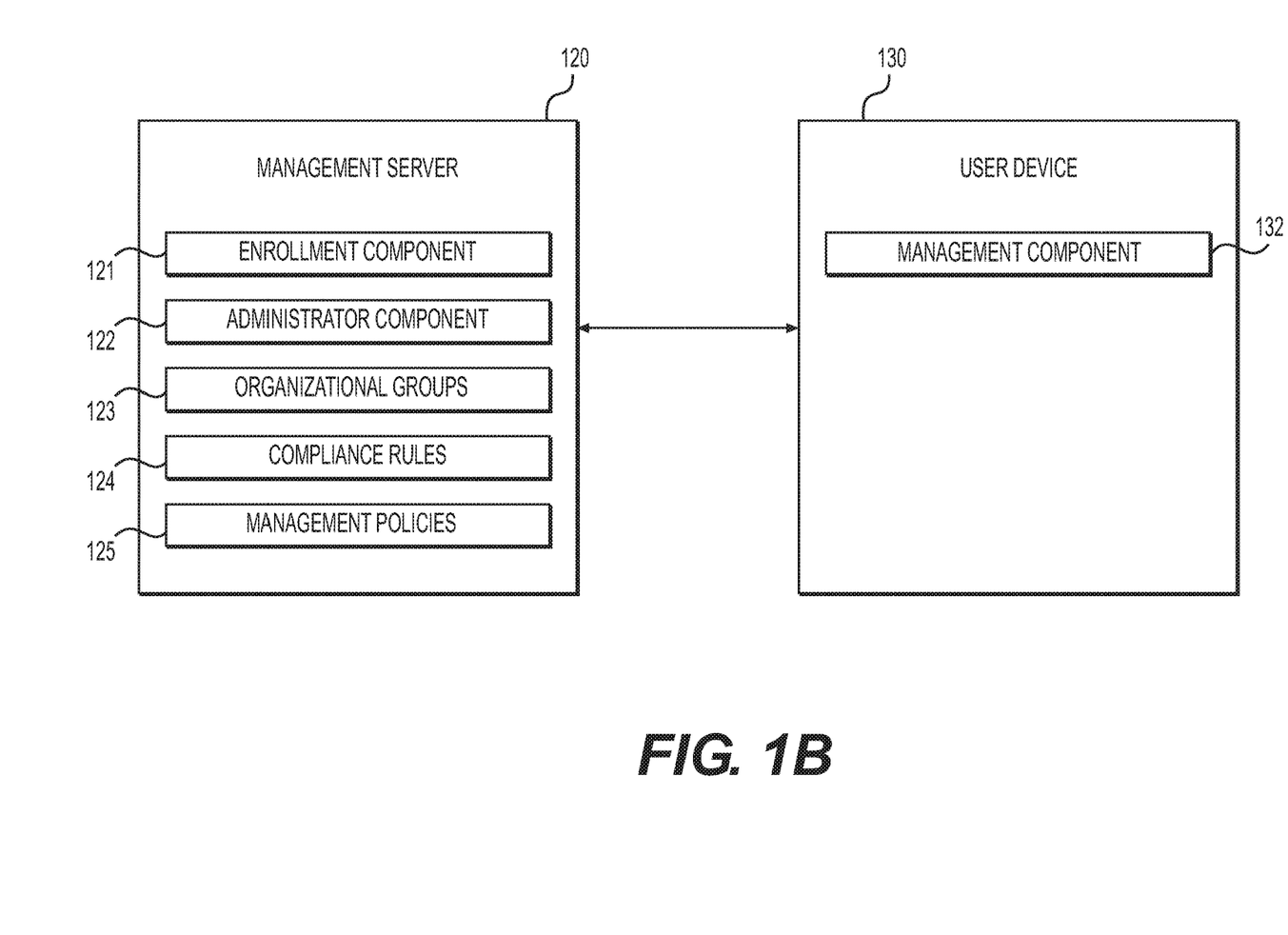
FIG. 1B is an exemplary illustration of system components for device enrollment and compliance monitoring.
Figure 2:
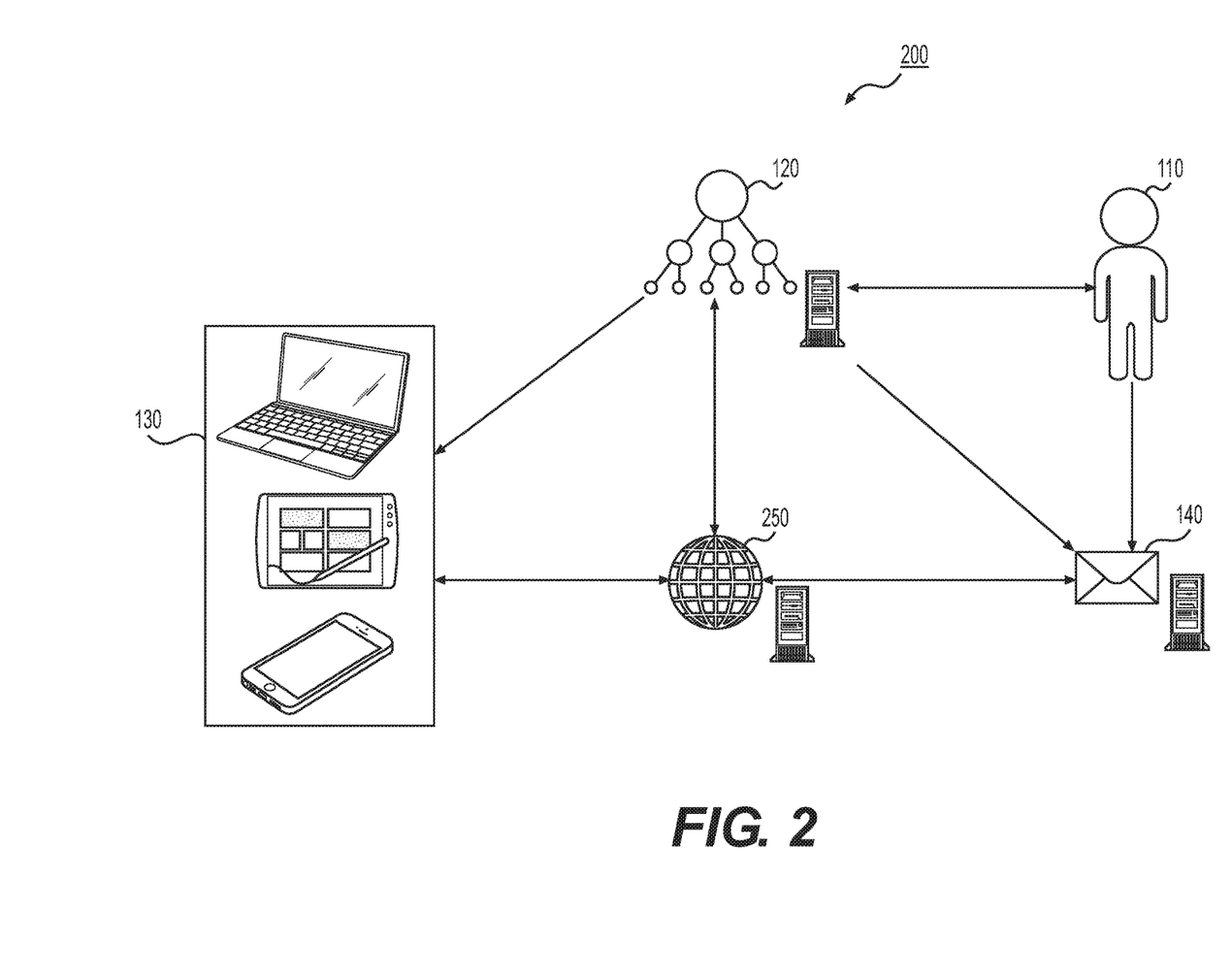
FIG. 2 is another exemplary illustration of system components for providing device-specific access to an e-mail server.
Figure 3:
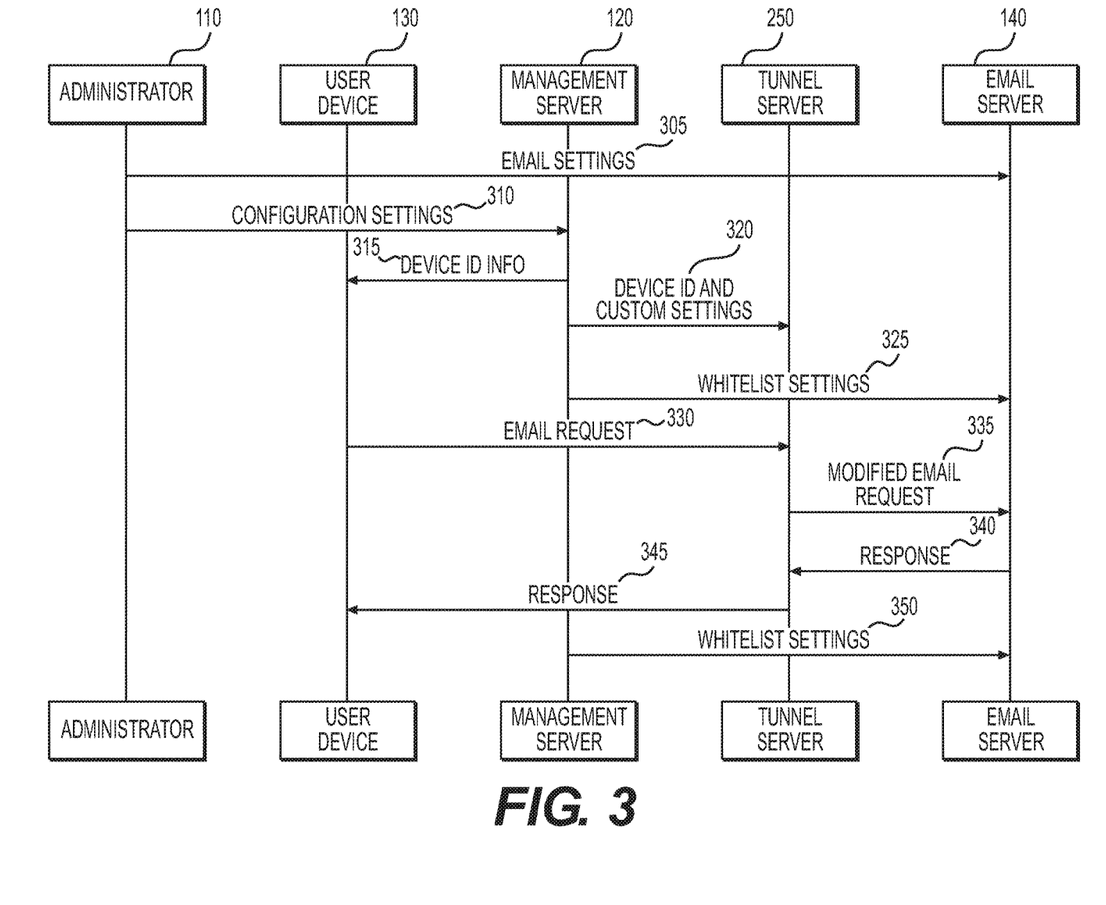
FIG. 3 is an exemplary method of providing device-specific access to an e-mail server.
Figure 4:
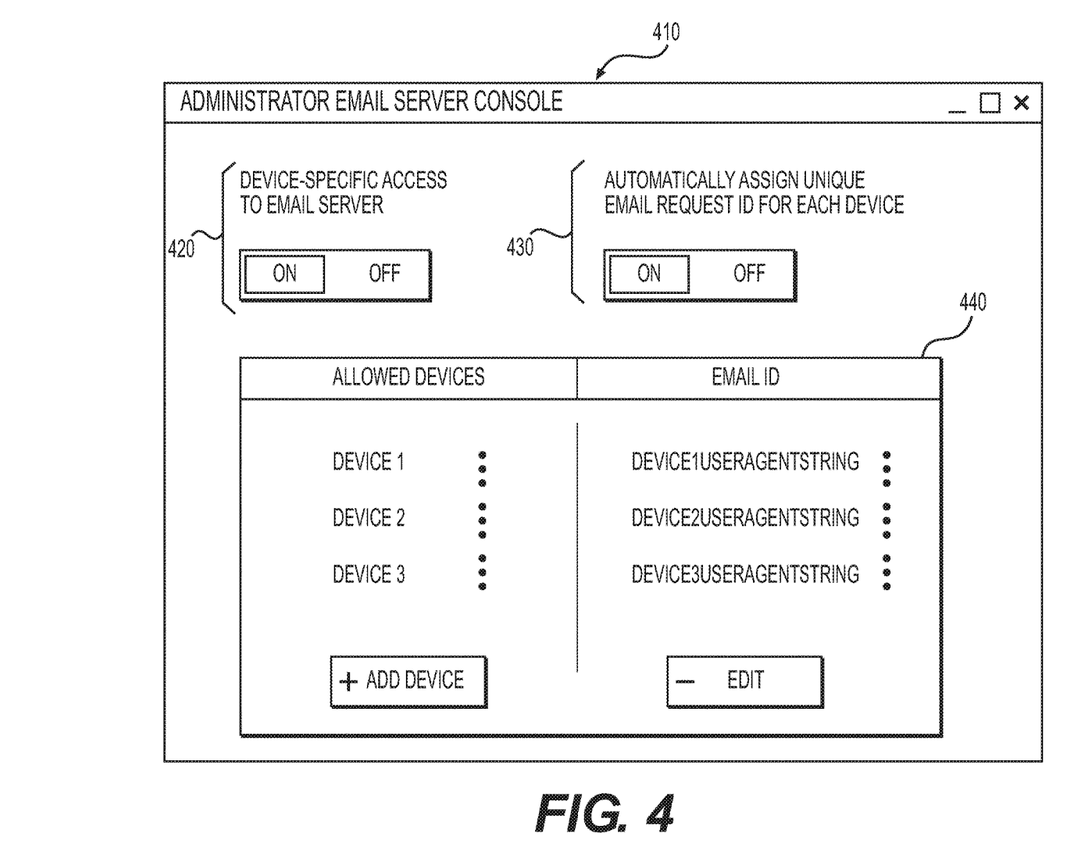
FIG. 4 is an exemplary illustration of an administrator console for providing device-specific access to an e-mail server.
Figure 5:
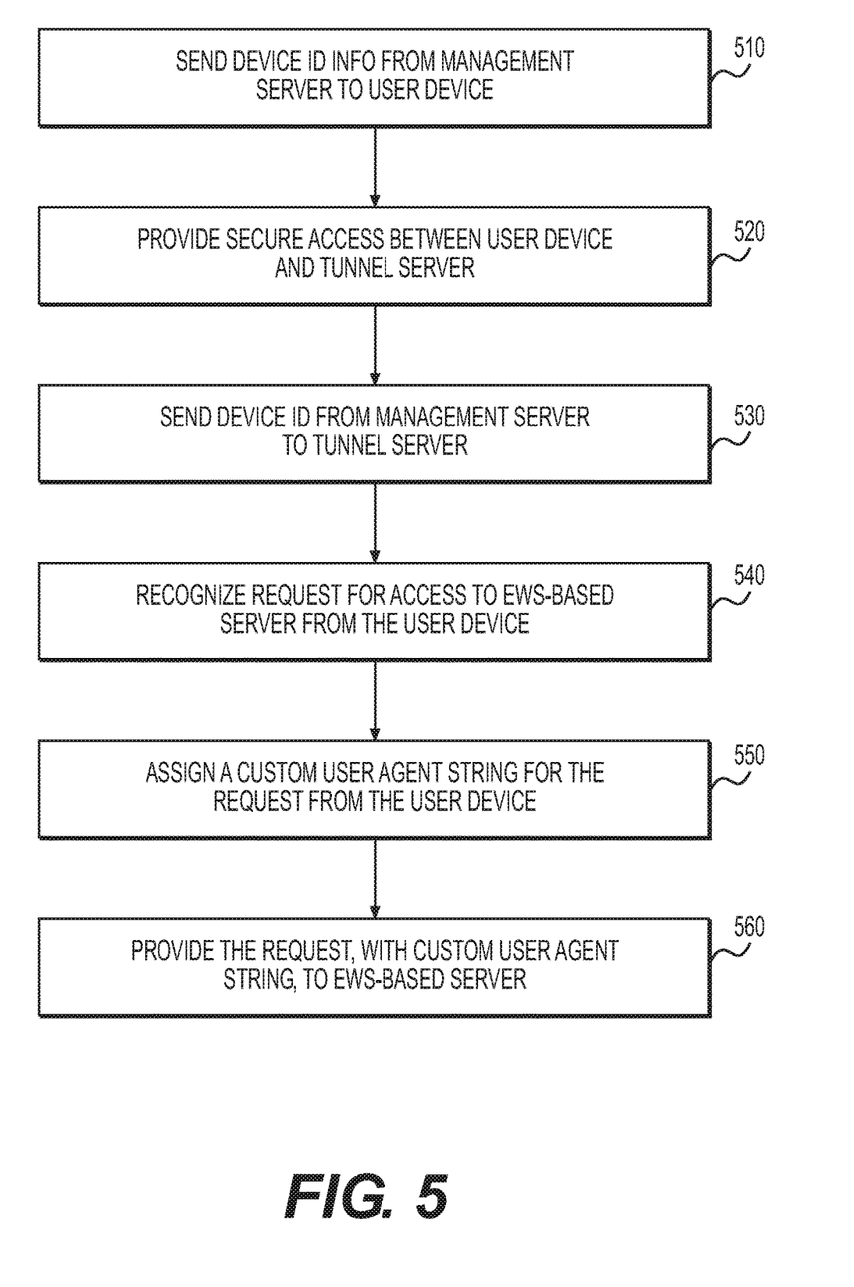
FIG. 5 is an exemplary method of providing device-specific access to an EWS-based e-mail server.

FIG. 1A provides an illustration and accompanying description of an example system for providing device-specific access to an e-mail server. FIG. 1B provides an example disclosure of system components for device enrollment and compliance monitoring, which can be implemented in various embodiments described throughout the specification. FIG. 2 provides a more detailed example of a system for providing device-specific access to an e-mail server, utilizing a tunnel server for additional security and control. FIG. 3 provides an example method that can encompass any system or method for providing device-specific access to an e-mail server, including those in FIGS. 1A and 2. FIG. 4 provides an example administrator console that can be used by a system administrator to efficiently implement, update, and otherwise change the settings for any system or method for providing device-specific access to an e-mail server. Finally, FIG. 5 provides an example method for providing device-specific access to an EWS-based e-mail server using a custom user agent string.

Turning to FIG. 1A, an illustration of an example system 100 is shown for providing device-specific access to an e-mail server 140. In some examples, the e-mail server 140 of FIG. 1 can be an EWS-based e-mail server. However, the e-mail server 140 can be any type of e-mail server. For example, the e-mail server 140 can be any e-mail server that does not utilize unique, per-device request identifiers for incoming server requests by default.

A system administrator 110 can manage the operations of system 100. The system administrator 110 can also be referred to as a sysadmin or a system operator. In either case, the system administrator 110 can have the ability to allow or block particular user devices 130 from accessing the e-mail server 140. This can include setting access rights for groups of users, to which many user devices 130 belong.

User devices 130 can include any computing device, such as a cell phone, laptop, tablet, personal computer, or workstation. A user device 130 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, although the term "user devices" is used in its plural form at times when describing system 100, the system 100 can function with just a single user device 130. Therefore, the terms "user device" and "user devices" are used interchangeably, as appropriate.

The user devices 130 can be enrolled with a management server 120. The management server 120 can be part of an overall EMM or MDM system, and can include multiple servers, processors, and computing devices. In some examples, the management server 120 is a network of servers, some of which can be located remotely from one another. In another example, the management server 120 is a single server with multiple purposes. In yet another example, the management server 120 is a server (or group of servers) dedicated to the operations described herein.

The system administrator 110 can have privileges associated with managing, editing, revising, and otherwise administrating the management server 120. These functionalities, along with enrollment and compliance in general, are described in more detail with respect to FIG. 1B. These details will be explained with reference to FIG. 1B before returning to the discussion of FIG. 1A.

FIG. 1B includes a management server 120 and a user device 130. The management server 120 can monitor and manage the operation of user devices 130, through the management server 120 itself, or more specifically, through a management service or program installed on the management server 120. Although one user device 130 is shown, the management server 120 can monitor and manage the operation of multiple user devices 130 enrolled in a device management service. The management server 120 can also provide access to email, calendar data, contact information, and other enterprise resources to enrolled user devices 130.

The management server 120 can include an enrollment component 121 and an administrator component 122, which can both be used for the process of enrolling user device 130. For example, a user device 130 can communicate with the enrollment component 121 during the initial stages of enrollment. In some examples, the enrollment component 121 can provide a token to the user device 130 indicating that the user device 130 has been authenticated and is permitted to communicate and enroll with the management server 120. The management server 120 or enrollment component 121 can provide the user device 130 with information regarding how to access and communicate with the administrator component 122 in order to continue the enrollment process.

In some examples, the administrator component 122 can request a token from the user device 130, indicating that the user device 130 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 120 and the enrollment process. In some examples, the administrator component 122 can be dedicated to a particular enterprise or group of enterprises, while the enrollment component 121 can be shared across multiple different enterprises.

Management server 120 can include one or more organizational groups 123. An organizational group 123 can include data representing a group of user devices 130 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

In addition to corresponding to a business team, an organizational group 123 can correspond to user devices 130 positioned in a particular geographic location. For example, a business can have different business locations, such as a public waiting room, private conference room, a laboratory, office space, and a parking garage. In this example, separate organizational groups 123 can be established for each of the public waiting room, private conference room, laboratory, office space, and parking garage. User devices 130 positioned in one of these locations can be included in the respective organizational group 123.

The management server 120 can also include compliance rules 124. A compliance rule 124 can set forth one or more conditions that must be satisfied in order for a user device 130 to be deemed compliant. If compliance is broken, the management server 120 can take steps to control access of the user device 130 to enterprise files and email. Compliance rules can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 130 is compliant can be made by the management server 120, the user device 130, or a combination of both. For example, the management component 132 on the user device 130 can generate a data object that describes the state of the user device 130, including any settings, parameters, applications, or other information regarding the state of the user device 130. The data object can be analyzed by the management server 120 or the user device 130 to determine whether the user device 130 is in compliance with compliance rules 124. In the case of the user device 130 analyzing compliance, a management component 132 installed on the user device 130 can make the comparison between the data object and compliance rules 124.

In one example, a compliance rule 124 can specify that a particular application is required to be—or prohibited from being—installed on a user device 130. In another example, a compliance rule 124 can specify that a user device 130 must be located in a secure location in order to comply with the compliance rule 124. This can be useful where greater or less access is desired in a particular location, such as allowing secured access while on an enterprise premises. In yet another example, a compliance rule 124 can specify that a user device 130 must be locked, such that a passcode or other credential is required, any time the user device 130 is accessed from a locked, sleeping, or off position.

Compliance rules 124 can also be based on time, geographical location, or device and network properties. For example, a compliance rule 124 can be based on the time or date, or both, matching specified values. In another example, the compliance rule 124 can require the user device 130 to be located in a particular geographic area. In another example, the compliance rule 124 can require the user device 130 to be connected to a particular local area network or wireless network, such as the network(s) located on the premises of an enterprise.

In some examples, a compliance rule 124 can require that a user device 130 be turned on, turned off, locked, unlocked, asleep, or awake during a particular time period. In another example, a compliance rule 124 can prohibit a user device from rendering content that has been designated as confidential relative to that particular user device 130. The determination of whether the content is confidential can be made, for example, based on the organizational group 123 to which the user device 130 belongs at the time. In fact, the organizational group 123 to which the user device 130 belongs can be used as a basis for any compliance rule 124, as appropriate.

The management server 120 can also include management policies 125 that direct the management of a user device 130. For example, a management policy 125 can specify which resources can be made available to a user device 130 from the management server 120. This can include, for example, specifying that the management server 120 is permitted to provide an e-mail service to the user device 130.

In some examples, the management policies 125 can specify the compliance rules 124 with which a user device 130 is required to comply. A compliance rule 124 can be assigned to one or more management policies 125. In some examples, a compliance rule 124 can be assigned to a particular organizational group 123. The management policy 125 can specify how the user devices 130 associated with that organizational group 123 are to be managed. For example, the management policy 125 can specify certain activities or functions that are required from, or prohibited by, user devices 130 associated with a particular organizational group 123.

The management component 132 can be a portion of an operating system for the user device 130, or it can operate in the application layer of the user device 130. For example, the management component 132 can be a dedicated application or other software installed on the user device 130 that can monitor and manage data, software components, and hardware components associated with the user device 130. The management component 132 can monitor and control functionality and other managed applications on the user device 130. The management component 132 can also determine whether a compliance rule 124 is, or has been, satisfied by the user device 130.

In some examples, the management component 132 can parse a data object describing the state of the user device 130, including various settings of the user device 130 as well as actions it has taken. Based on the data object, the management component 132 can determine whether various compliance rules 124 have been satisfied. In some examples, the management component 132 can communicate with the management server 120 to determine whether the compliance rules 124 are satisfied by the user device 130. For example, the management component 132 can cause the data object to be transmitted to the management server 120 to facilitate that determination.

The management component 132 can be an application, or portion of an application, that provides functionality beyond simply monitoring and managing resources in the user device 130. In one example, the management server 120 can provide a software development kit (SDK) that a developer can use to insert, for example, security libraries into the application. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management component 132 executing in a user device 130. For example, if a security library provides the ability to monitor and enable or disable functionality provided by an application, the management component 132 can call functions provided by the library to monitor and enable or disable the functionality.

A management policy 125 can specify that a user device 130 has permission to perform or access certain functionality by virtue of that user device 130 being associated with an organizational group 123. For example, a management policy 125 can be created without reference to a particular user device 130. Instead, the management policy 125 can be associated with an organizational group 123. The organizational group 123 can change over time and include different user devices 130 over time. But because the management policy 125 is associated with the organizational group 123 rather than the any particular user device 130, the management policy 125 can apply to all user devices 130 within the organizational group 123 at any given time.

In one example, a user device 130 can become a member of, or become associated with, an organizational group 123 when an administrator specifies that the user device 106 should be a member. In another example, a user device 130 becomes associated with an organizational group 123 when a membership condition is satisfied, such as through a dynamic evaluation of the membership condition. A membership condition can be created by an administrator 110 by specifying a condition relating to the user device 130 that, when satisfied, causes the user device 130 to be associated with the organizational group 123. Similarly, the membership condition can be created such that when a condition relating to the user device 130 is met (or not met), the user device 130 is removed from the organizational group 123.

Alternatively, a user device 130 can become disassociated with an organizational group 123 based on the user of the user device 130. For example, an administrator 110 or dynamic evaluation can identify an individual for additional to, or removal from, an organizational group 123. If the user operates multiple user devices 130, all of the user's user devices 130 can be added to, or removed from, the organizational group 123 of interest. In this way, all of the user's user devices 130 can be made subject to a uniform set of management policies 125 and compliance rules 124.

In some examples, a management policy 125 can be associated with a compliance rule 124. More specifically, a compliance rule 124 can specify a compliance condition and an action that should be taken by the management server 120 if the compliance condition is either met or not met. In one example, a compliance rule 124 can include a rule condition for an attempt by a user to access confidential resources. The compliance rule 124 can be configured to recognize this attempt to thwart a management policy 125, and can cause remedial action to be taken. For example, the compliance rule 124 or management policy 125 can cause the user device 130 to be locked or otherwise blocked from accessing particular information.

As part of the enrollment or management of a user device 130, an administrator 110 can create a device record for the user device 130. The device record can be stored on the management server 120, and can include data related to the management of the user device 130. For example, the device record can include data describing one or more of: the identity and type of the user device 130; components of the user device 130; the state of the user device 130; organizational groups 123 to which the user device 130 belongs; compliance rules 124 with which the user device 130 must comply; and management policies 125 that specify if, when, and how the user device 130 is permitted to function.

For example, data describing the identify and type of the user device 130, as well as the components of the user device 130, can include at least one or more of: a unique identifier associated with the user device 130; a device type of the user device 130 (e.g., a smartphone, a tablet computing, a laptop computer, a desktop computer, a server computer, or a virtualized instance of any of such computer types); and various software and hardware components of the user device 130 (e.g., operating system (or kernel or bios) type and version, processor type and speed, memory type and size, network interface types, various I/O component types such as camera, touchscreen, keyboard, mouse, printer).

With respect to data describing the state of the user device 130, such data can include can specify, for instance, various settings that are applied to the user device 130, various applications that are installed on or being executed by the user device 130, and various files that are installed on or are accessible to the user device 130. Additionally, the data describing the state of the user device 130 can specify information related to the management of the user device 130, such as the last time the user device 130 provided data describing its state to the management server 120. The data can also describe whether the user device 130 is in a state of compliance with any applicable compliance rules 124, and whether any remedial actions have been (or are to be) taken as a result of a noncompliance with any applicable compliance rules 124.

The data describing organizational groups 123 to which the user device 130 belongs can, for example, include any organizational groups 123 of which the user device 130 is a member, either by virtue of a hard-coded relationship between the user device 130 and the organizational group 123, or by virtue of a dynamic evaluation of a membership condition associated with the organizational group 123.

The data describing compliance rules 124 with which the user device 130 must comply can, for instance, specify one or more remedial actions that should be performed in the event that an associated rule condition occurs. Data describing management policies 125 can include permissions of the user device 130, such as access rights, and settings that are being enforced upon the user device 130. In some examples, the data describing compliance rules 124 and the data describing management policies 125 can be obtained from an organizational record associated with an organizational group 123 to which the user device 130 is a member.

In some examples, an administrator 110 can manually input data into the administrator component 122 in order to generate a device record for a user device 130. In other examples, the administrator component 122 can obtain a data object, such as an electronic spreadsheet, extensible markup language (XML) file, or comma separated values (CSV) file. The administrator component 122 can extract information describing the user device 130 from the data object to create a corresponding device record. The device record for each user device 130 can include information identifying each user device 130 and its respective device record.

In some examples, after the administrator component 122 creates a device record for a user device 130, the management server 120 can detect whether the user device 130 is enrolled. For example, the management server 120 can determine whether a flag is set, indicating that the user device 130 is enrolled.

If the user device 130 is not yet enrolled, the management server 120 can automatically transmit information identifying the user device 130 to the enrollment component 121. For example, the user device 130 can transmit a device identifier, such as its media access control (MAC) address, to the enrollment component 121. In some examples, when the enrollment component 121 receives the device identifier, the enrollment component 121 can determine whether a corresponding device record exists. If there is no corresponding device record, the enrollment component 121 can determine that the user device 130 is not authorized to enroll.

Turning back to FIG. 1A, the management server 120 can track each enrolled user device 130 and distinguish particular actions, or inactions, among the various enrolled user devices 130. For example, the management server 120 can store a registry with information relating to each enrolled user device 130. The registry can include additional information assigned by the management server 120. An example of additional information would be an authentication certificate or token. The management server 120 can provide the authentication certificate or token to the user device 130 and to other components of the system 100, thereby identifying requests to or from a user device 130 as being associated with that particular device.

The management server 120 can also provide information to an e-mail server 140 within the system 100. For example, the management server 120 can provide the e-mail server 140 with information regarding a custom user agent string to be placed on an allow list. In some examples, the management server 120 first confirms that a particular user device 130 is enrolled with the system. This can be accomplished by, for example, accessing a data object associated with the enrollment component 121 or the administrator component 122 (shown in FIG. 1B) of the management server 120. The management server 120 can also confirm that the user device 130 is complying with all applicable compliance rules 124 (shown in FIG. 1B) relevant to the user device 130. This can be accomplished by, for example, accessing a data object associated with the compliance rules 124 or management policies 125 (shown in FIG. 1B). In some examples, the management server 120 can request a new or updated data object reflecting the current state of the user device 130, to ensure that enrollment and compliance are up to date.

Although the e-mail server 140 is shown as part of system 100, it may be a third-party server, or group of servers. For example, e-mail server 140 can be an EWS-based server provided by MICROSOFT. In another example, e-mail server 140 can be an EWS-based server run by the entity implementing the management server 120. E-mail server 140 need not be EWS-based. For example, e-mail server 140 can be an e-mail server utilizing a communication protocol (other than EWS) that lacks the default functionality to provide or recognize unique request identifiers on a per-device level.

The system administrator 110 can provide instructions and other information to both the e-mail server 140 and the management server 120. For example, the system administrator 110 can instruct the e-mail server 140 to enforce an allow list and a block list. In one example, the allow list includes one or more request identifiers. That is, the allow list includes a request identifier that would typically be associated with, and included in, a certain type of request. In the case of an EWS-based e-mail server, the request identifier can be a user agent string. In one example, the request identifier corresponds to a particular e-mail client installed on a user device 130. For example, all requests coming from an OUTLOOK for Mac e-mail client can have the same request identifier, and that request identifier can be placed on an allow or block list by the system administrator 110.

The system administrator 110 can also place custom request identifiers on an allow or block list at the e-mail server 140. For example, the system administrator 110 can cause the management server 120 to generate and assign a custom request identifier to a particular user device 130. As discussed in more detail below, the management server 120 can cause all requests from a single user device 130 to the e-mail server 140 to include the custom request identifier. In the example of an EWS-based e-mail server 140, the custom request identifier can be a custom user agent string. If the custom request identifier is on an allow list at the e-mail server 140, the request is allowed access to the e-mail server 140.

Several options can be used to provide a custom request identifier for a request from a user device 130 to the e-mail server 140. In FIG. 1, the management server 120 can generate a custom request identifier and assign it to a particular user device 130. The management server 120 can also send instructions to the e-mail server 140, instructing the e-mail server 140 to place the custom request identifier on an allow list.

In order to utilize the custom request identifier, a request from a user device 130 needs to be modified in some way to replace the default request identifier with the custom request identifier. In the example of FIG. 1, the management server 120 provides the user device 130 with the capability to implement the custom request identifier at the device level. For example, the management server 120 can provide the user device with instructions to replace the default request identifier with a custom request identifier selected by the management server 120. The user device 130 can accordingly alter each of its request identifiers as directed by the management server 120. In some examples, this can be accomplished by a management component 132 (as shown in FIG. 1B) installed on the user device 130. The management component 132 can parse data flowing to or from the user device 130, identifying and modifying requests as desired. Due to the potential security risk of providing the user device 130 with a whitelisted custom request identifier, the management server 120 can use an encryption algorithm or service to prevent unwanted discovery of the custom request identifier.

Continuing the example of FIG. 1, the user device 130 can receive a custom request identifier from the management server 120 and incorporate it into any outgoing requests to the e-mail server 140. The e-mail server 140 can recognize the custom request identifier, based on previous instructions obtained from the management server 120, and therefore authorize access. The e-mail server can then return a response to the user device 130.

If a user device 130 is later un-enrolled from the system 100, the management server 120 can prevent the user device 130 from continuing to use the custom request identifier. For example, the management server 120 can wipe the custom request identifier from the user device 130. In some examples this can be done as part of removing any EMM or MDM software associated with enrollment in the system 100. The management server 120 can also remove or disable access for the custom request identifier at the e-mail server 140.

FIG. 2 provides a representation of a system 200 for providing device-specific access to an e-mail server 140 with an added layer of security relative to the system 100 of FIG. 1. As in FIG. 1, the e-mail server 140 of FIG. 2 can be any type of e-mail server, including an EWS-based e-mail server. More particularly, the e-mail server 140 can be any e-mail server that does not utilize unique, per-device request identifiers for incoming server requests by default.

A system administrator 110 can manage the operations of system 200, and can have the ability to allow or block particular user devices 130 from accessing the e-mail server 140. The user devices 130 of FIG. 2 can include any computing device, such as a cell phone, laptop, tablet, personal computer, or workstation. Regardless of whether the user devices 130 are referred to in a singular or plural manner, the terms are intended to be used interchangeably, as appropriate. System 200 can function with just a single user device 130, or with many user devices 130.

The user devices 130 can be enrolled with a management server 120 in the same manner described above with respect to FIG. 1. That is, the management server 120 can be part of an overall EMM or MDM system, and can include multiple servers, processors, and computing devices. In some examples, the management server 120 is a network of servers, some of which can be located remotely from one another. In another example, the management server 120 is a single server with multiple purposes. In yet another example, the management server 120 is a server (or group of servers) dedicated to the operations described herein.

The system administrator 110 can have privileges associated with managing, editing, revising, and otherwise administrating the management server 120. For example, the system administrator 110 can determine which devices 130 to enroll or un-enroll. The system administrator 110 can also make determinations regarding which applications an enrolled user device 130 is allowed to download or utilize while enrolled with the management server 120. For example, the system administrator 110 can allow a new employee to enroll his or her device 130 and download EMM-related applications providing access to secure document storage locations and a secure e-mail server 140.

The management server 120 can track each enrolled user device 130 and distinguish particular actions, or inactions, among the various enrolled user devices 130. For example, the management server 120 can store a registry with information relating to each enrolled user device 130. The registry can include additional information assigned by the management server 120. An example of additional information would be an authentication certificate or token. The management server 120 can provide the authentication certificate or token to the user device 130 and to other components of the system 200, thereby identifying requests to or from a user device 130 as being associated with that particular device.

The management server 120 can also provide information to an e-mail server 140 within system 200. For example, the management server 120 can provide the e-mail server 140 with information regarding a custom user agent string to place on an allow list. Although the e-mail server 140 is shown as part of system 200, it may be a third-party server, or group of servers. For example, e-mail server 140 can be an EWS-based server provided by MICROSOFT. In another example, e-mail server 140 can be an EWS-based server run by the entity implementing the management server 120. E-mail server 140 need not be EWS-based. For example, e-mail server 140 can be an e-mail server utilizing a communication protocol (other than EWS) that lacks the default functionality to provide or recognize unique request identifiers on a per-device level.

As depicted in FIG. 2, the management server 120 can also connect to a tunnel server 250. Although the tunnel server 250 is depicted and discussed as a single server, it can include multiple servers, processors, and computing devices. In some examples, the tunnel server 250 is a network of servers, some of which can be located remotely from one another. The tunnel server 250 can provide a centralized connection between the user devices 130 and the e-mail server 140. The user devices 130 can establish a secure connection to the tunnel server 250 using, for example, a per-app VPN. In some examples, the tunnel server 250 is dedicated to handling traffic between the user devices 130 and the e-mail server 140.

The management server 120 can connect to the tunnel server 250 and provide various types of information regarding the user devices 130, e-mail server 140, and expected requests. For example, the management server 120 can provide device identification information for one or more of the user devices 130. The device identification information can include, for example, an authentication certificate for the user device 130 that, when compared to an authentication certificate provided by the user device 130 itself, identifies the particular user device 130 to the tunnel server 250. Any other type of authentication may be used as well, such as tokens, certificates, or passwords. The device identification information can also include an expected or default request identifier; for example, a default user agent string for the e-mail client installed on the user device 130. The device identification information can also include a custom request identifier, such as a custom user agent string, to be used for requests originating from a particular user device 130.

In an example, the management server 120 provides a custom user agent string to both the tunnel server 250 and the e-mail server 140, along with instructions for the tunnel server 250 to rewrite outgoing requests from a user device 130 to include the custom user agent string. When the tunnel server 250 receives a request from the user device 130, it can first authenticate the user device 130 by comparing an authentication certificate, token, or other authentication information received from the user device 130 to the authentication information provided by the management server 120.

Once the user device 130 has been authenticated, the tunnel server 250 can search for the custom user agent string assigned to that user device by the management server 120. The tunnel server 250 then rewrites the mail request originating from the user device 130, replacing the default user agent string with the custom user agent string. The custom user agent string matches the custom user agent string sent to the e-mail server 140 by the management server 120.

As a result, the tunnel server 250 receives the request originating from the user device 130, authenticates the request, modifies the request with a custom user agent string, and passes the request to the e-mail server 140. The e-mail server 140, in turn, compares the custom user agent string to the user agent strings listed in an allow list, and if the user agent string matches an allowed entry, allows the connection and provides an appropriate response to the request. For example, the e-mail server 140 sends a response back to the tunnel server 250. The tunnel server 250 then passes that response to the user device 130 through, for example, a per-app VPN connection established between the tunnel server 250 and the user device 130.

In the example described above, the management server 120 provides information regarding the custom user agent string to both the e-mail server 140 and the tunnel server 250. However, in some examples the information regarding the custom user agent string can be provided to the e-mail server 140 by the tunnel server 250, rather than the management server 120.

The administrator 110 can set e-mail access at the management server 120 for groups of user devices 130. Upon doing so, the management server 120 can communicate custom user agent strings to the e-mail server 140. The management server 120 can further update a whitelist of allowable user devices 130 and pairings with custom user agent strings at the tunnel server 250 to reflect the updated access permissions set at the management server 120. When a whitelisted user device 130 contacts the tunnel server 250, the custom user agent string can be provided to the e-mail server 140.

The management server 130 can also update the whitelist based on whether the user device is up to date on enrollment and compliance. For example, the management server 120 can confirm that a particular user device 130 is currently enrolled by accessing a data object associated with the enrollment or administrator components 121, 122 (shown in FIG. 1B). The management server 120 can confirm compliance of the user device 130 by access a data object associated with the compliance rules 124 or management policies 125 (shown in FIG. 1B) relevant to that user device 130. If the user device 130 is enrolled and compliant, it can be added to the whitelist. But if the user device 130 is not enrolled or compliant, the management server 130 can remove it from the whitelist.

In this way an administrator can set the management server 130 to deny email access even in an EWS setting when particular compliance rules are broken. The user device 130 will not have access to e-mail on the e-mail server 140 when not enrolled or compliant. If the user device 130 falls out of compliance because it, for example, becomes jailbroken, moves to an untrusted geographic area, or fails to check in with a server for a while, then the management server 120 can instruct the e-mail server 140 to take the custom user agent string off the whitelist.

In another example, the tunnel server 250 can be responsible for updating user agent strings at the e-mail server 140. The tunnel server 250 can receive a request from a user device 130 and authenticate the user device 130. In this example, after authentication, the tunnel server 250 can instruct the e-mail server 140 to add a custom user agent string to the allow list at the e-mail server 140. After the custom user agent string is placed on the allow list at the e-mail server 140, the tunnel server 250 can modify the request from the user device 130, using the custom user agent string, and send the modified request to the e-mail server 140. If the user device 130 is not enrolled or compliant, the management server 120 can instruct the tunnel server 250 to rewrite user agent strings from the non-compliant user device 130 to a user agent string that is on a blacklist.

FIG. 3 is an exemplary method of providing device-specific access to an e-mail server, using a system similar to the system 200 of FIG. 2. However, many of the stages of FIG. 3 can also apply to other systems, such as the system 100 of FIG. 1. At stage 305, an administrator 110 can send e-mail settings to an e-mail server 140 to configure the e-mail server 140 as necessary for carrying out the remaining stages of the method. The e-mail settings can include, for example, instructions for the e-mail server 140 to enforce an allow list, such as an EWS allow list. In another example, the e-mail settings can include instructions to disable access to the entire organization. In some examples both of these instructions can be provided at stage 305, thereby allowing access only to users on the allow list.

At stage 310, the administrator 110 can send configuration settings to a management server 120. The configuration settings can include, for example, EMM configuration items such as a Managed E-mail configuration. The configuration settings can also include compliance rules 124 or management policies 125 to be put in place for a particular user, user device 130, or organizational group 123. For example, a compliance rule 124 can require that all user devices 130 connect through a secure tunnel server 250 when using certain e-mail clients. The configuration settings can also cause the user devices 130 to connect to the tunnel server 250 through a per-app VPN. Creation of a Managed E-mail configuration can cause the management server 120 to determine which default user agent string is expected from a user device 130. For example, the management server 120 can determine which e-mail client a user device 130 can use for e-mail access, and thereby determine the default user agent string associated with that user device 130. Stage 310 can also include providing instructions to the management server 120 to create device identification information, such as an authentication certificate or token place on a user device 130.

At stage 315, the management server 120 provides device identification information to the user device 130 when the device is enrolled and compliant with any compliance rules established by administrator 110. In one example, the device identification information includes an authentication certificate or token to be used for authentication purposes. In another example, the device identification information provides information to a user device 130 regarding the particular e-mail client to be used to access the e-mail server 140, the per-app VPN to be used with that e-mail client, and any other information needed to carry out the stages of FIG. 3.

At stage 320, the management server 120 can provide device identification information and custom settings to the tunnel server 250. In one example, the management server 120 provides information to the tunnel server 250 regarding the default request identifier (for example, the default user agent string) expected from a particular user device 130. In another example, the management server 120 provides information sufficient to verify an authentication certificate or token to be provided by a user device 130. With respect to the custom settings, the management server 120 can provide instructions to the tunnel server to rewrite an e-mail request from a user device 130 to include a custom request identifier (for example, a custom user agent string). In some examples, the management server 120 provides instructions for a plurality of user devices 130. The management server 120 could, for example, provide a table listing various user devices 130, their associated authentication information and expected default request identifier, and the desired custom request identifier.

Stage 325 can occur before, after, or simultaneously with stage 320. At stage 325, the management server 120 can provide the e-mail server 140 with whitelist settings. In one example, the whitelist settings include a custom request identifier, such as a custom user agent string, along with instructions to allow access to a request including that custom request identifier. The term "whitelist" is used to indicate that the custom request identifier is being placed on an allow list. Otherwise, the e-mail server 140 would deny access to a request lacking a whitelisted request identifier.

At stage 330, the user device 130 can cause an e-mail request to be sent to the tunnel server 250. This can be accomplished, for example, by utilizing an e-mail client installed on the device 130 to connect to the tunnel server 250 using a per-app VPN. The e-mail request can include a default request identifier, such as a default user agent string, used by the particular e-mail client installed on the device 130. The e-mail request can also include the device identification information provided from the management server 120 to the user device 130, in order to identify the particular user device 130 to the tunnel server 250. For example, the e-mail request can include an authentication certificate or token that matches the authentication information stored at the tunnel server 250.

Upon authenticating the e-mail request from stage 330, the tunnel server 250 can modify the request and send a modified e-mail request to the e-mail server 140 at stage 335. This stage can include the authentication of the e-mail request from stage 330. For example, the tunnel server 250 can compare the authentication certification or token from the user device 130 to the authentication information provided to the tunnel server 250 at stage 320. The tunnel server 250 can also modify the e-mail request by removing or replacing the default request identifier with a custom request identifier. In some examples, this includes replacing the default user agent string with a custom user agent string.

At stage 340, the e-mail server 140 can return a response to the tunnel server 250. As part of this stage, the e-mail server 140 can parse the e-mail request to verify that the request identifier is allowed access to the e-mail server 140. For example, the e-mail server 140 can compare the request identifier to the request identifiers listed on an allowed list. A request identifier may be listed on the allowed list as a result of the whitelist settings sent from the management server 120 to the e-mail server at stage 325. If the request identifier is allowed, the e-mail server 140 process the request and sends a response to the tunnel server 250.

At stage 345, the tunnel server 250 can receive a response from the e-mail server 140 and pass the response through to the appropriate user device 130. For example, the tunnel server 250 can send the response through a per-app VPN being utilized by an e-mail client installed on the user device 130. In some examples, the process involving the tunnel server 250 is kept invisible to the user device 130, such that a user is only aware of their e-mail request and the resulting response received at the user device 130.

At stage 350, the management server 120 can optionally send whitelist settings to the e-mail server 140. This stage can be made optional, and is intended to reflect action (relative to the e-mail server 140) that can be taken when a user device 130 is unenrolled from the EMM system. This stage can occur automatically, for example, by way of a compliance rule 124 that requires a user device 130 to be enrolled with the system. A compliance rule 124 can specify that a user device 130 must remain enrolled with system, and can access a data object associated with the enrollment component 121 or the administrator component 122 (shown in FIG. 1B) to determine compliance. The un-enrollment process can include alternative or additional stages relating to the management server 120 and user device 130. But with respect to the e-mail server 140, the un-enrollment process can include instructions to remove a particular user device 130 from an allow list or whitelist. As a result, the user device 130 will no longer be able to access e-mail stored on the e-mail server 140. This process can be used, for example, when a user is no longer employed by the enterprise running the EMM system.

FIG. 4 provides an exemplary illustration of an administrator's console for providing device-specific access to an e-mail server. More specifically, an administrator e-mail server console 410 is depicted. The console 410 can be any type of user interface for use by a system administrator 110. For example, the console 410 can be a window shown on a display of a computing device. In another example, the console 410 is a screen of a smartphone. The console 410 can be displayed on any type of device. A system administrator 110 can utilize the administrator e-mail server console 410 to control which users have access to a particular e-mail server 140.

The console 410 can include an option to enable or disable device-specific access to the e-mail server, shown in FIG. 4 as button 420. When button 420 is set to "ON," the console 410 can send instructions (such as those sent at stage 305 of FIG. 3) to the e-mail server 140 to enforce an allow list. Additionally, when button 420 is set to "ON," the console 410 can send configuration settings (such as those sent at stage 310 of FIG. 3) to the management server 120. The system administrator 110 can also set button 420 to "OFF," which can automatically send instructions to the e-mail server 140 to stop enforcing the allow list and instead return to allowing default request identifiers (such as default user agent strings).

The console 410 can also include an option to automatically assign unique e-mail request identifiers for each device 130, shown in FIG. 4 as button 430. As explained above, in some examples a system administrator 110 can cause the management server 120 to assign a custom request identifier, such as a custom user agent string, to a particular device. The system administrator 110 may want each device to use a unique user agent string to increase the security of the e-mail system. In that case, the administrator can simply set button 430 to "ON," causing instructions to be sent to the management server 120, and potentially also to the tunnel server 250, to automatically assign unique request identifiers to each user device 130 requesting access to the e-mail server 140.

A detailed window 440 can be included in the console 410 to provide a system administrator 110 with easy access to view and edit various types of information. For example, the detailed window 440 can include a column listing the allowed devices, which can include user devices 130 with authorization to access the e-mail server 140. The system administrator 110 can view all of the authorized user devices 130, manually add or delete devices 130 from the list, and view/edit more detailed information regarding each device 130. The detailed information regarding each device 130 can be tied to other software functions within the EMM system. For example, a system administrator could view the detailed information by way of the three dots to the right of a listed device 130, and choose to un-enroll the device 130 from the entire EMM system. This selection could cause the administrator e-mail server console 410 to send instructions to the management server 120 to perform un-enrollment services beyond those related to accessing the e-mail server 140.

Similarly, the detailed window 440 can include a column showing e-mail request identifiers for each user device 130 listed in the allowed devices column. In the example of FIG. 4, each device 130 corresponds with one e-mail request identifier. In this example, the e-mail server 140 is an EWS-based server, and the e-mail request identifiers are therefore modified user agent strings. For example, Device 1 corresponds to "Device1UserAgentString," Device 2 corresponds to "Device2UserAgentString," and so on. The naming convention is merely exemplary, and is used to show that each device 130 can include a unique, customized request identifier. Even with button 430 set to "ON," the administrator 110 can further revise the request identifiers by selecting the three buttons to the right of an identifier, or by selecting the "Edit" button with the detailed window 440. As with the allowed devices, revisions to the e-mail request identifiers can automatically propagate throughout the EMM system without requiring the administrator 110 to manually report those changes to the management server 120, tunnel server 250, or e-mail server 140.

The administrator e-mail server console 410 can be configured to include any other functionality a system administrator 110 may need to enable access to an e-mail server 140 in the desired manner. From a more general standpoint, any function that would require sending instructions to a management server 120, tunnel server 250, e-mail server 140, or user devices 130 can be built into the console 410 in the form of a button, table, list, or entry. In this manner, the system administrator 110 can quickly make changes without spending the time and effort to send instructions manually. The console 410 can also include features for accessing, creating, deleting, or otherwise modifying an enrollment component 121, administrator component 122, organizational groups 123, compliance rules 124, or management policies 125. For example, the console 410 can include a feature allowing an administrator 110 to implement a compliance rule 124 specifying that a camera component of the user device 130 must remain off while in a geographic location corresponding with a high-security vault or room. Any other features, instructions, stages, or steps described in any of the examples herein can be incorporated into the administrator console 410.

FIG. 5 provides an example method for providing device-specific access to an EWS-based e-mail 140 server using a custom user agent string. At stage 510, the method includes sending device identification information from the management server 120 to a user device 130. The device identification information can include information sufficient to identify a particular user device 130 to other servers within the system, such as a tunnel server 250. For example, the device identification information can include an authentication certificate or token.

At stage 520, the method includes providing secure access between a user device 130 and the tunnel server 250. The tunnel server 250 can provide secure access to or from the user device 130, for example, through a per-app VPN. In an example, each mail client can be supported by a VPN. As an example, a user device 130 can use a per-app VPN for handling traffic through an OUTLOOK for Mac application on the user device 130.

At stage 530, the management server 120 can send device identification information to the tunnel server 250. Stage 530 may occur before stages 520 or 510. In some examples, stages 510 and 530 are carried out simultaneously or in close proximity to one another. The device identification information sent from the management server 120 to the tunnel server 250 can include information sufficient to identify a particular user device 130 connecting to the tunnel server 250. For example, the device identification information can include an authentication certificate or token that can be compared to, or otherwise matched with, the authentication certificate or token provided to the user device 130 at stage 510. The user device 130 can include its authentication certificate or token in its communication with the tunnel server 250 to allow the tunnel server 250 to authenticate the user device 130. In some examples, the device identification information includes an expected user agent string. For example, the management server 120 can determine the e-mail client that a user device 130 utilizes to connect to the tunnel server 250. As a result, the management server 120 can identify to the tunnel server 250 a default user agent string associated with that e-mail client. The tunnel server 250 can use the expected default user agent string as authenticating information. The device identification information sent to the tunnel server 250 at stage 530 can also include a custom user agent string to be used for requests to the EWS-based server 140 from that particular user device 130.

At stage 540, the method includes recognizing a request for access from the user device 130 to an EWS-based e-mail server 140. In some examples, stage 540 is performed by the tunnel server 250. For example, the tunnel server 250 can receive a request for access from the user device 130 through a per-app VPN. The request from the user device 130 can include device identification information. The tunnel server 250 can compare, or otherwise authenticate, the device identification information based on the matching device identification sent to the tunnel server 250 by the management server 120. For example, the tunnel server 250 can confirm that an authentication certificate included in the request from the user device 130 matches the authentication information provided by the management server 120 with respect to that same user device 130. As another example, the tunnel server 250 can compare the default user agent string included in the request from the user device 130 to the expected user agent string provided by the management server 120.

At stage 550, after authorizing or authenticating the user device 130, the tunnel server 250 can assign a custom user agent string for the request from the user device 130. In an example, this stage can include the tunnel server 250 assigning, replacing, rewriting, or otherwise changing the default user agent string to a custom user agent string. This stage can also include providing the EWS-based e-mail server 140 with the custom user agent string, either from the management server 120 or the tunnel server 250. Alternatively, the custom user agent string can be provided to the EWS-based e-mail server 140 as part of a separate or independent stage.

At stage 560, the method includes providing the request, with custom user agent string, to the EWS-based e-mail server 140. For example, the tunnel server 250 can pass the request for access from the user device 130, as modified by the tunnel server 250 with respect to the user agent string, to the EWS-based e-mail server 140. The EWS-based e-mail server 140 can handle the request similar to a standard request. For example, the EWS-based e-mail server 140 can compare the user agent string with an allow list to determine whether the user agent string is allowed access to the server 140. As mentioned earlier, in an earlier stage (or a separate stage not shown in FIG. 5), the management server 120 or the tunnel server 250 can provide the EWS-based e-mail server 140 with instructions to add the custom user agent string to an allow list. As a result, the server 140 can handle the customized request without delay.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for authorizing access to an e-mail server, comprising:
   a management server configured to:
      provide first authentication information to a user device; and
      provide a plurality of custom user agent strings to the e-mail server, the plurality of custom user agent strings identifying one or more specific devices that are authorized to access the e-mail server; and
   a tunnel server providing secure access to or from the user device through a Virtual Private Network (VPN), wherein the tunnel server is configured to:
      receive, from the management server, the first authentication information;
      receive, from the user device, a request for access to the e-mail server, the request comprising second authentication information and a user agent string that identifies an e-mail client making the request;
      compare the first authentication information with the second authentication information;
      based on a match between the first authentication information and the second authentication information:
         create a custom user agent string by modifying the user agent string; and
         provide the e-mail server with a modified request including the custom user agent string,
         wherein the e-mail server compares the custom user agent string in the modified request with the plurality of custom user agent strings to determine whether to authorize the user device to access the e-mail server.

2. The system of claim 1, wherein modifying the user agent string comprises adding a device identifier to the user agent string.

3. The system of claim 1, wherein the e-mail server is an Exchange-Web-Services (EWS)-based server.

4. The system of claim 1, further comprising an administrator console in communication with the management server, the administrator console allowing an administrator to selectively allow or block access to the e-mail server for the user device by adding or removing, respectively, the custom user agent string associated with the user device from the plurality of custom user agent strings.

5. The system of claim 1, wherein the user agent string received from the user device at the tunnel server does not comprise a device identifier.

6. The system of claim 1, wherein providing first authentication information to the user device comprises providing the first authentication information to the e-mail client installed on the user device the management server is configured to provide authentication information to the user device through an e-mail client installed on the user device.

7. The system of claim 1, wherein the management server is further configured to:
   remove a custom user agent string from the plurality of user agent strings based on an associated device breaking compliance with a compliance rule; and
   provide an updated plurality of custom user agent strings to the e-mail server, wherein the updated plurality omits the removed custom user agent string.

8. A non-transitory, computer-readable medium containing instructions that, when executed by a processor, performs stages for authorizing access to an e-mail server, the stages comprising:
   sending first authentication information from a management server to the user device;
   sending a plurality of custom user agent strings to the e-mail server, the plurality of custom user agent strings identifying a plurality of user devices authorized to access the e-mail server;
   providing secure access between the user device and a tunnel server using a VPN;
   receiving from the management server, at the tunnel server, the first authentication information;
   receiving from the user device, at the tunnel server, a request for access to the e-mail server, the request comprising second authentication information and a user agent string that identifies an e-mail client making the request;
   comparing, by the tunnel server, the first authentication information with the second authentication information;
   based on a match between the first authentication information and the second authentication information:
      creating, by the tunnel server, a custom user agent string by modifying the user agent string; and
      providing, by the tunnel server to the e-mail server, a modified request including the custom user agent string,
      wherein the e-mail server compares the custom user agent string in the modified request with the plurality of custom user agent strings to determine whether to authorize the user device to access the e-mail server.

9. The non-transitory, computer-readable medium of claim 8, wherein modifying the user agent string comprises adding a device identifier to the user agent string.

10. The non-transitory, computer-readable medium of claim 8, wherein the e-mail server is an EWS-based server.

11. The non-transitory, computer-readable medium of claim 8, wherein the stages further comprise selectively allowing or blocking access to the e-mail server for the user device by adding or removing, respectively, the custom user agent string associated with the user device from the plurality of custom user agent strings.

12. The non-transitory, computer-readable medium of claim 8, wherein the user agent string received from the user device at the tunnel server does not comprise a device identifier.

13. The non-transitory, computer-readable medium of claim 8, wherein sending the first authentication information from the management server to the user device comprises sending the first authentication information through the e-mail client installed on the user device.

14. The non-transitory, computer-readable medium of claim 8, wherein the management server is configured to:
   remove a custom user agent string from the plurality of user agent strings based on an associated device breaking compliance with a compliance rule; and
   provide an updated plurality of custom user agent strings to the e-mail server, wherein the updated plurality omits the removed custom user agent string.

15. A method for providing device-specific access to an e-mail server, comprising:

sending first authentication information from a management server to the user device;
sending a plurality of custom user agent strings to the e-mail server, the plurality of custom user agent strings identifying a plurality of user devices authorized to access the e-mail server;
providing secure access between the user device and a tunnel server using a VPN;
receiving from the management server, at the tunnel server, the first authentication information;
receiving from the user device, at the tunnel server, a request for access to the e-mail server, the request comprising second authentication information and a user agent string that identifies an e-mail client making the request;
comparing, by the tunnel server, the first authentication information with the second authentication information;
based on a match between the first authentication information and second authentication information:
    creating, by the tunnel server, a custom user agent string by modifying the user agent string; and
    providing, by the tunnel server to the e-mail server, a modified request including the custom user agent string,
    wherein the e-mail server compares the custom user agent string in the modified request with the plurality of custom user agent strings to determine whether to authorize the user device to access the e-mail server.

16. The method of claim 15, wherein modifying the user agent string comprises adding a device identifier to the user agent string.

17. The method of claim 15, wherein the e-mail server is an EWS-based server.

18. The method of claim 15, further comprising selectively allowing or blocking access to the e-mail server for the user device by adding or removing, respectively, the custom user agent string associated with the user device from the plurality of custom user agent strings.

19. The method of claim 15, wherein the user agent string received from the user device at the tunnel server does not comprise a device identifier.

20. The method of claim 15, wherein the management server is configured to:
    remove a custom user agent string from the plurality of user agent strings based on an associated device breaking compliance with a compliance rule; and
    provide an updated plurality of custom user agent strings to the e-mail server, wherein the updated plurality omits the removed custom user agent string.

* * * * *